United States Patent [19]

Hughes

[11] 3,942,768

[45] Mar. 9, 1976

[54] MOBILE MIXER

[75] Inventor: William Felix Hughes, Belmont, Australia

[73] Assignee: Hughes Steel Products Pty. Ltd., Belmont, Australia

[22] Filed: July 19, 1974

[21] Appl. No.: 491,551

[52] U.S. Cl.................................. 259/21; 259/6
[51] Int. Cl.² ..................... B01F 7/08; B01F 15/02
[58] Field of Search .................. 259/6, 21, 41, 104

[56] References Cited
UNITED STATES PATENTS

| | | | |
|---|---|---|---|
| 3,370,796 | 2/1968 | Herr | 259/6 X |
| 3,421,740 | 1/1969 | Behrens | 259/6 X |
| 3,790,138 | 2/1974 | Neier | 259/41 |

*Primary Examiner*—Stanley N. Gilreath
*Assistant Examiner*—Alan Cantor
*Attorney, Agent, or Firm*—Haseltine, Lake & Waters

[57] ABSTRACT

A mixer comprising a substantially trough shaped bin said bin being substantially rectangular when viewed in plan, the lower portion of each of the side walls of said bin slope inwardly to form a central longitudinal channel at the bottom of said bin, a 1st pair of horizontally mounted longitudinal augers situated in said trough and rotatably driven so as to feed from the front to the rear of the bin and also cause the feed to be fed upwardly and away from the centre of said trough, a 2nd pair of horizontally mounted longitudinal augers positioned wider apart and above 1st said pair and caused to rotate and feed in the same direction as 1st said augers.

3 Claims, 5 Drawing Figures

MOBILE MIXER

This invention relates to an improved mixer.

Whenever more than one ingredient is contained in a feed ration mixing becomes a necessity. Efficient mixing is necessary to ensure that each beast or bird receives its proper ration. With cattle, each animal needs its proper ration to achieve the weight gain or milk production required. If a feed containing several ingredients is not mixed then the situation exists where the feed may contain pockets or layers of different material. Some of the cattle when feeding will feed on hay and others may feed on grain. Those eating hay will convert less efficiently than those on grain and the ones on grain run the risk of eating lethal feed. When this feed is correctly mixed and each animal given equal opportunities to eat the feed, then the animals that are not performing in weight gain can be checked and culled if necessary. It therefore is essential that feeds containing ingredients should be thoroughly and correctly mixed and it is with this object in mind that this invention has set out to achieve.

In one form the invention resides in a mixer comprising a substantially trough shaped bin, said bin being substanitally rectangular when viewed in plan, the lower portion of each of the side walls of said bin slope inwardly to form a central longitudinal channel at the bottom of said bin, a 1st pair of horizontally mounted longitudinal augers situated in said trough and driven so as to feed from the front to the rear of the bin and so rotate so as to cause feed to be fed upwardly and away from the centre of said trough, a 2nd pair of horizontally mounted longitudinal augers positioned wider apart and above 1st said pair and caused to rotate and feed in the same direction as 1st said augers, said augers mixing and feeding ingredients from an input at one end of said bin to a discharge point at the rear portion of said bin.

The invention will be better understood by reference to one specific embodiment as shown in the accompanying drawings wherein.

Figure 1:
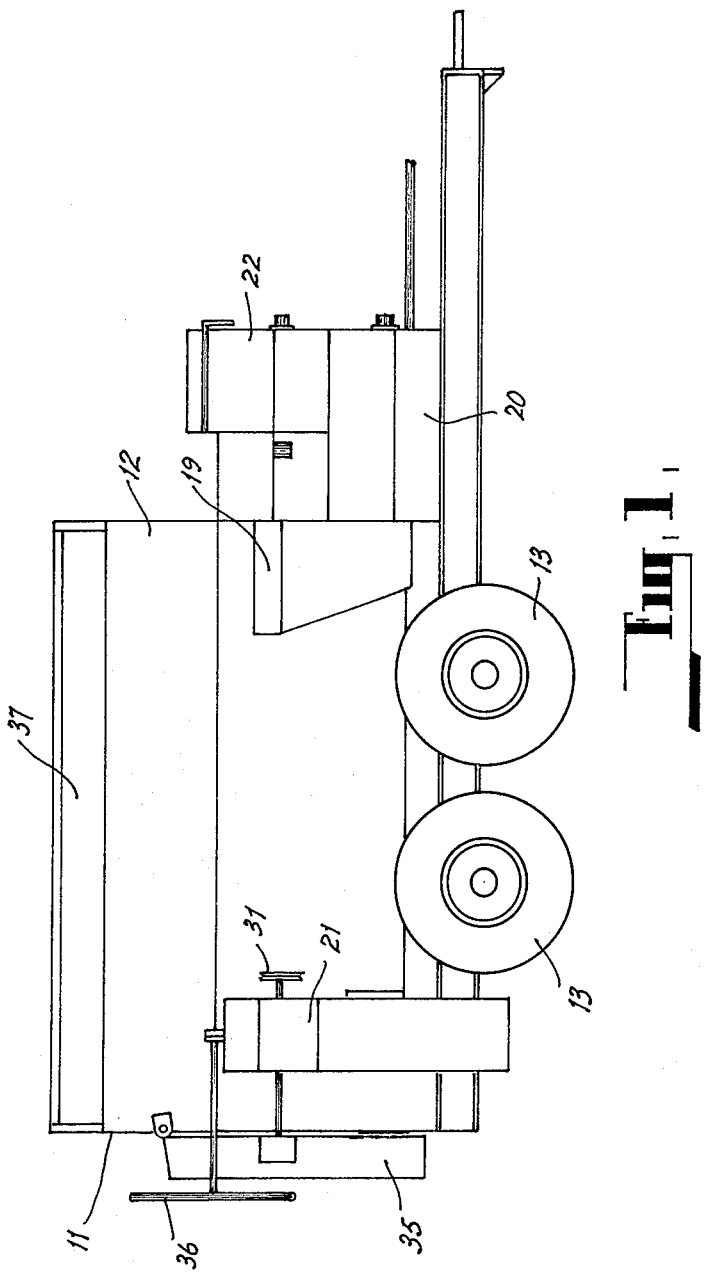
FIG. 1 is a side elevation of the mixer as a mobile unit.

In this embodiment a mixer 11 is constructed comprising a substantially trough shaped bin 12. The mixer 11 is generally mounted upon transportation means 13 but may be used in a fixed position if so desired. The lower portion 14 of each of the side walls 15 of the bin slope inwardly to form a central longitudinal channel at the bottom 16 of the bin. Positioned in the bottom channel section of the bin is a horizontally and longitudinally mounted 1st pair of augers 17. Also horizontally and longitudinally mounted above and slightly wider apart than 1st said augers 17, are a 2nd pair of augers 18. Both sets of augers 17 and 18, are operated so as to transfer feed from inlet points 19 and 20 to the discharge opening 21.

The lower augers 17 extend from the mixer compartment through a channelled recess 20 up to and including the area covered by the hammer mill 22. If a roller mill (not shown) is attached to the front of the hammer mill 22 then a separate smaller screw or auger is used to carry the feed into the channelled recess 20 below the hammer mill.

Figure 2:
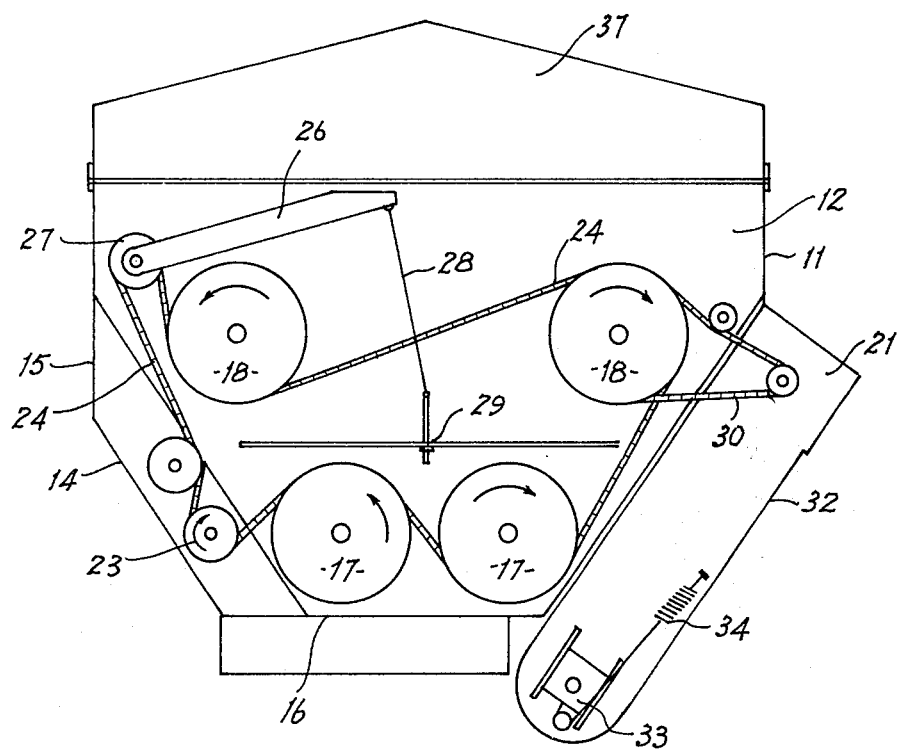
FIG. 2 is a sectional end elevation of the drive means and auger arrangement.
Figure 3:
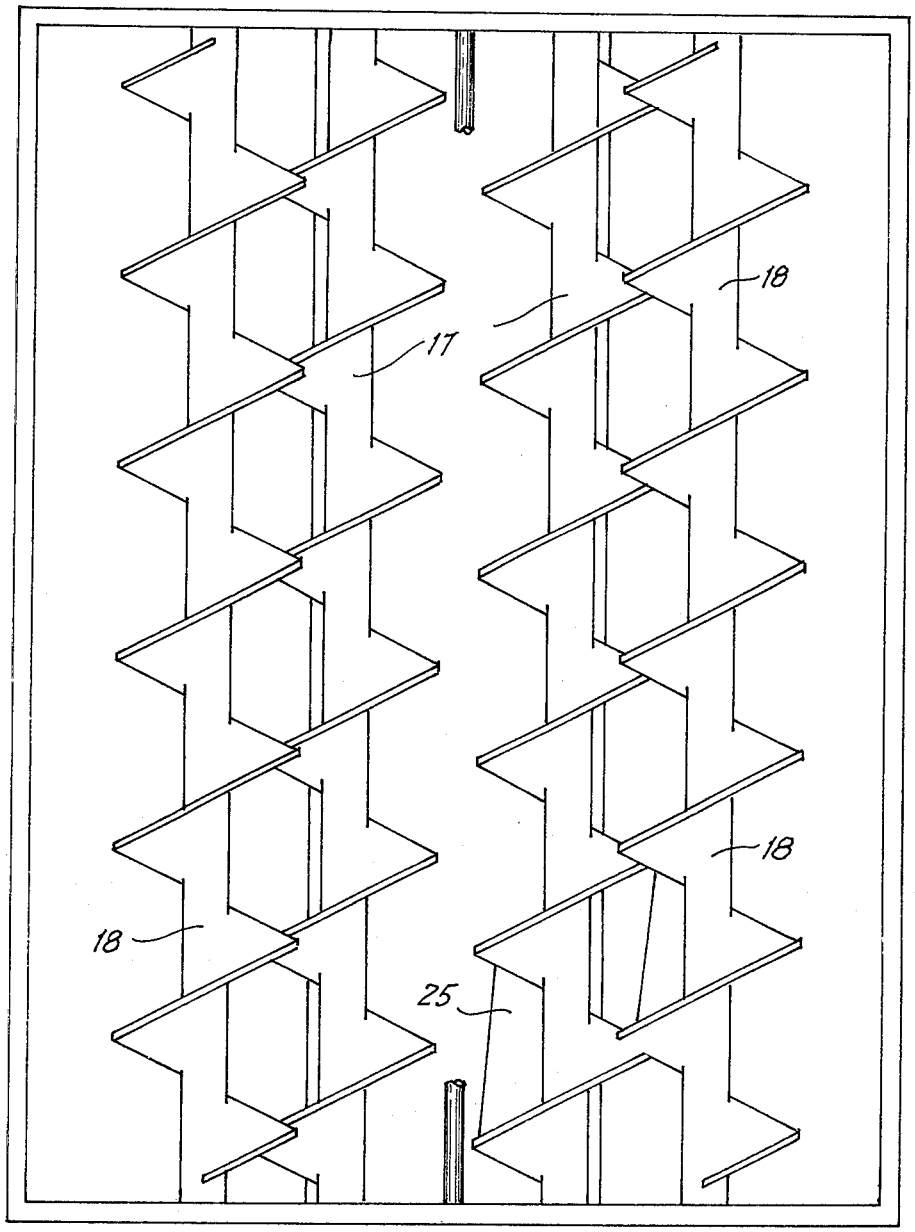
FIG. 3 is a plan view of the augers situated in the bin.
Figure 4:
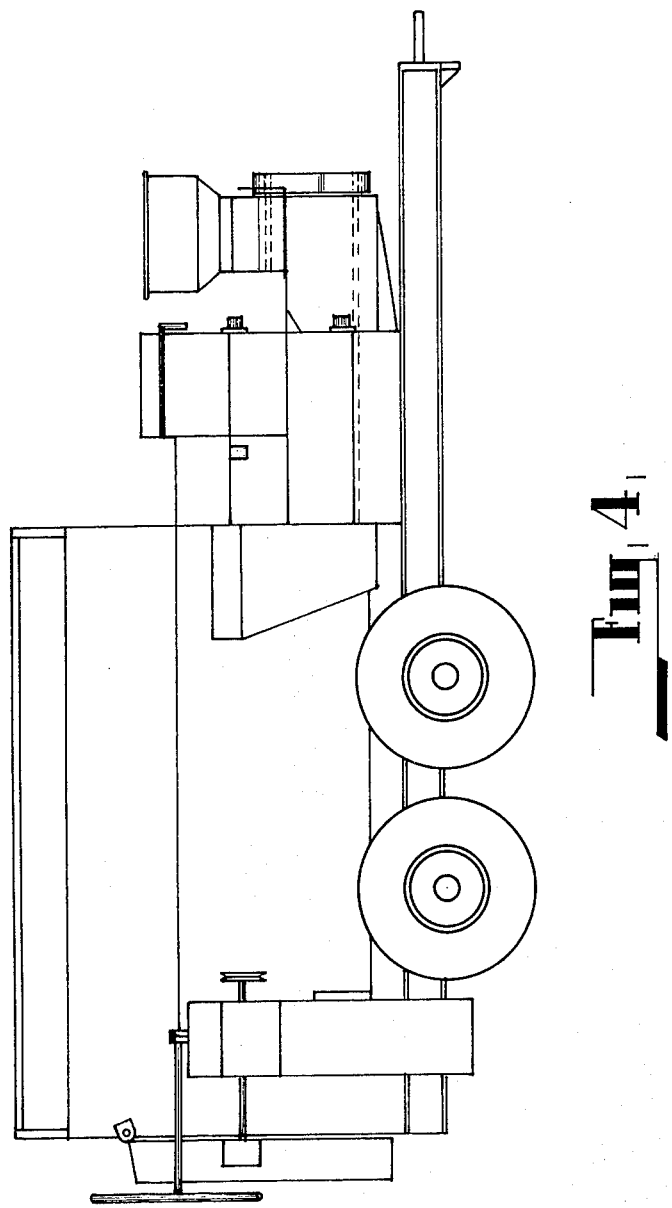
FIG. 4 is a side elevation of the mixer as a mobile unit with a roller mill and additional smaller auger.
Figure 5:
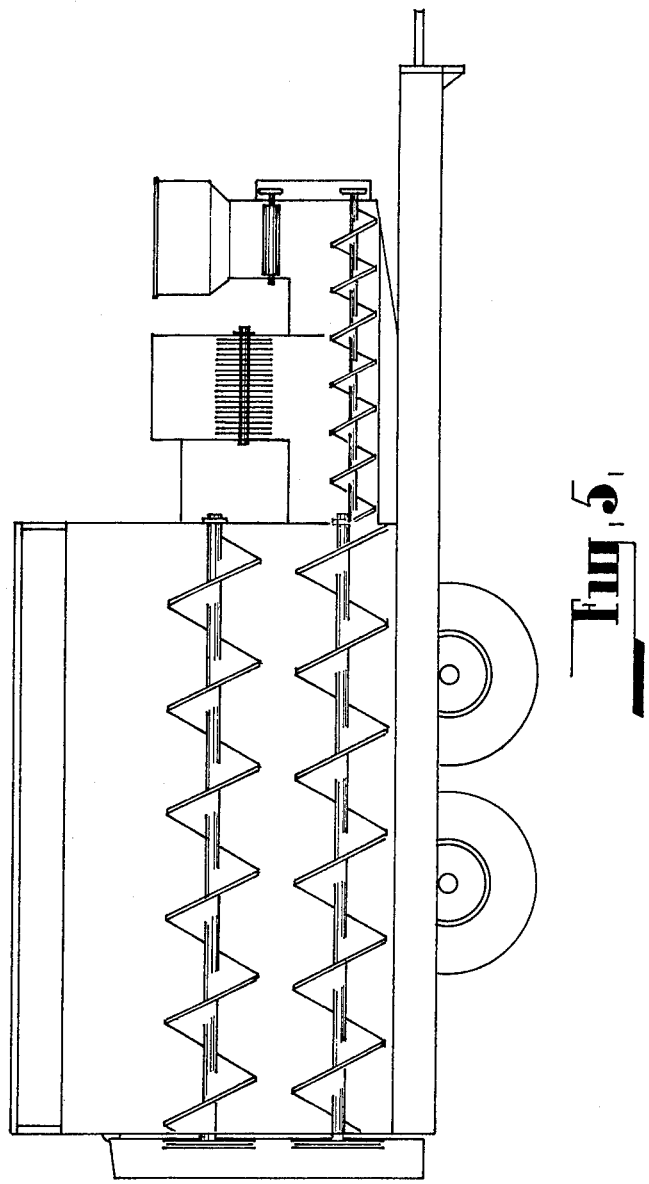
FIG. 5 is a side elevation of the mixer of FIG. 4 and shows the augers in respective places.

Feed may be introduced into the bin by way of direct input through opening 19 or by the use of a hammer mill 22 feeding into the bin through inlet recess 20. The operation of the hammer mill 22 and roller mill may be carried out by suitable linkage and connection to the power take off mechanism of a tractor. The power take off is also used to drive both sets of augers from the rear of the mixing bin. Power is supplied to the rear of the bin by a drive shaft linking the power take off unit to a gear box (not shown) mounted on the rear of the mixer. The gear box controls the drive of a driver sprocket 23 which operates in a clockwise direction. A one inch pitch chain 24 is linked around a series of jockeys, and sprockets to drive augers 17 and 18. The method of linking or engaging the various sprockets is shown in FIG. 2 of the drawings where it will be noticed that when viewed from the rear the left hand set of augers (both upper and lower) rate in an anticlockwise direction and the right hand set of augers (both upper and lower) rotate in a clockwise direction. This has the effect that once in the mixer, hay, grain and any additives are not only mixed in a basic clockwise/horizontal direction but due to the set of reverse flight augers and specially located wiper plates 25 a double vertical, circular rotation is achieved. This results in an evenly and consistently prepared feed ration. Chain tensioning means 26 are provided by way of a jockey sprocket 27 and spring 28. The tension of the spring 28 and resultant tension of chain 24 being controlled by adjustment means 29. A small chain 30 is used to operate pulley 31 and so drive the paddles or buckets contained within a high side discharge unit (not shown). FIG. 2 of the drawings reveals a conventional side discharge unit 32 with the bearing bracket 33 and tension means 34 being visible from the outside. The bearing bracket 33 being used to operate the discharge paddles contained within the discharge unit. The chain drive mechanism is protected by cover 35. Door opening means 36 is provided at the rear of the mixer to control the opening and closing of the side discharge unit. To prevent moisture from damaging the feed ration, a removeable cover 37 is provided to cover the mixing bin 12.

The mixer is constructed with a capacity of 170 cubic feet and will handle 40 bales of hay.

Whilst the invention has been described with reference to one specific embodiment thereof it is not limited thereto. The mixer may be constructed of various shapes and sizes and may be stationary or of a mobile construction. The mobile unit being drawn and operated by a tractor or other suitable means.

I claim:

1. A material mixer comprising:
   an elongated substantially trough shaped bin having side and end walls, said side walls sloping downwardly and inwardly to form a central longitudinal channel at the bottom of said bin;
   a first pair of horizontally extending augers mounted rotatably for rotation in opposite directions within said bin adjacent the bottom thereof and having flights arranged to convey material from one end of said bin to the other end of said bin and upwardly within said bin;
   a second pair of horizontally extending augers mounted rotatably within said bin above said first pair of augers spaced apart further than said first pair of augers, the augers of said second pair being adapted for rotation respectively in the same direction as the respective underlying auger of said first pair and to convey material from said one end of the bin to said other end;

a hammer mill mounted adjacent said one end of said bin in communication therewith;

a recessed channel extending between said bin and hammer mill to provide said communication therebetween;

said first pair of augers extending from said bin into said hammer mill for the conveyance of material from said hammer mill into said bin to the said other end thereof;

and means for rotating said first and second pair of augers.

2. A material mixer according to claim 1 wherein said material mixer is mounted on self-powered vehicular means.

3. A material mixer according to claim 1 including a roller mill mounted adjacent said hammer mill remote from said bin, and auguer means separate from said first and second pair of augers connected to said first augers for conveying material from said roller mill to said bin through said recessed channel.

* * * * *